Figure 4:
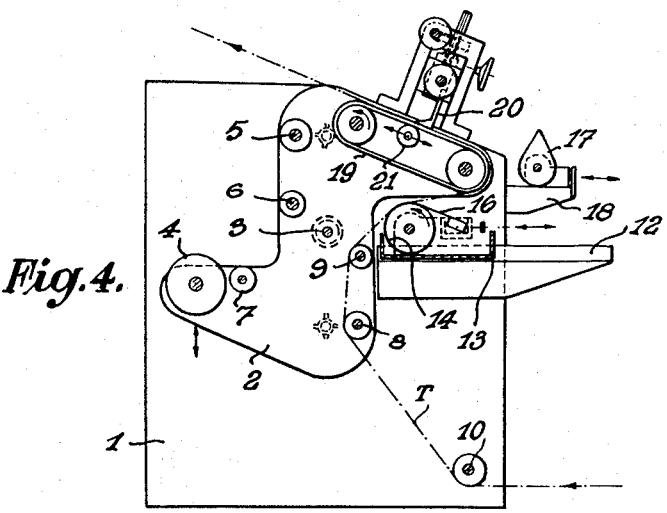

March 23, 1965  J. BOONE  3,174,456
COMBINED COATING MACHINE, ESPECIALLY FOR THE APPLICATION OF
VARIOUS LAYERS OF PLASTIC SUBSTANCE ON A PAPER
SUPPORT OR THE LIKE
Filed Oct. 10, 1961  2 Sheets-Sheet 1
Fig. 2.
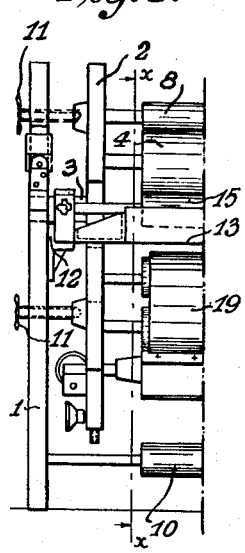
Fig. 1.
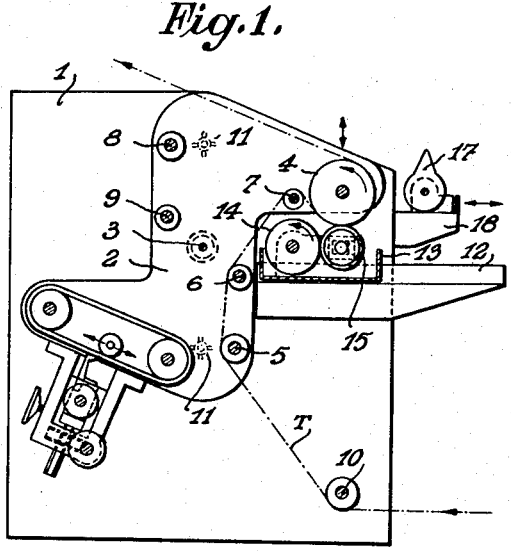
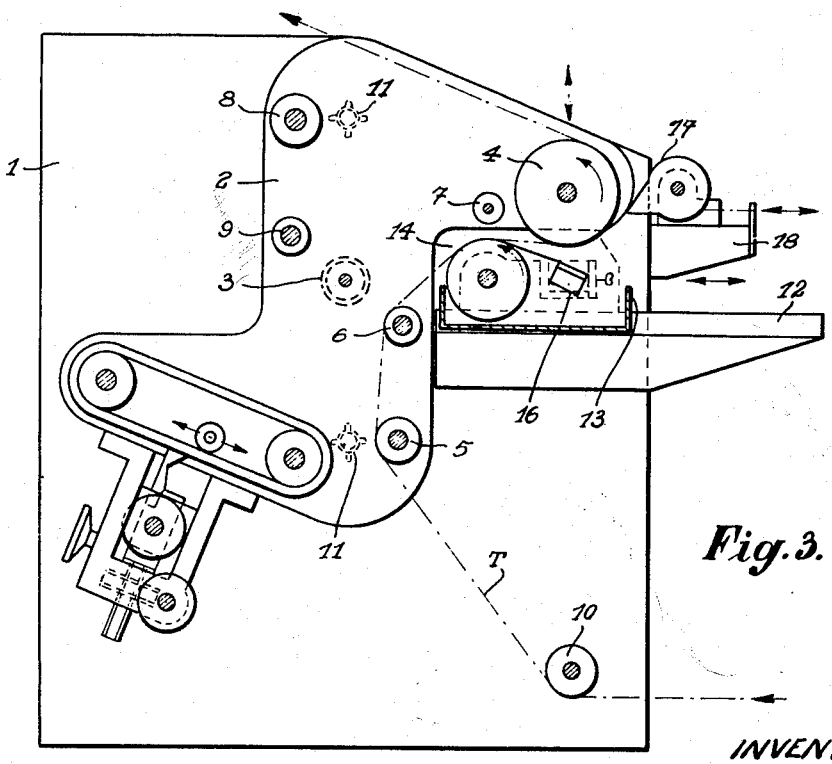
Fig. 3.
INVENTOR
JOSEPH BOONE
BY Robert A. Jarret
AGT.

March 23, 1965 J. BOONE 3,174,456
COMBINED COATING MACHINE, ESPECIALLY FOR THE APPLICATION OF
VARIOUS LAYERS OF PLASTIC SUBSTANCE ON A PAPER
SUPPORT OR THE LIKE
Filed Oct. 10, 1961 2 Sheets-Sheet 2

INVENTOR
JOSEPH BOONE

BY Robert H Jacob
AGT.

3,174,456
COMBINED COATING MACHINE, ESPECIALLY FOR THE APPLICATION OF VARIOUS LAYERS OF PLASTIC SUBSTANCE ON A PAPER SUPPORT OR THE LIKE
Joseph Boone, Vedrin, Belgium, assignor to Marius Berghgracht, Ghent, Belgium
Filed Oct. 10, 1961, Ser. No. 144,127
Claims priority, application Luxembourg, Oct. 14, 1960, 39,282
6 Claims. (Cl. 118—63)

Complex materials in sheet or film form of undetermined length and comprising a plurality of layers of different substances which are generally thermo-plastic, are of considerable importance in the packaging industry, for example for the manufacture of heat-sealable fluid-tight sacks, bags and boxes. It is, notably, possible to manufacture with these complex materials packaging means of high quality having excellent combined properties of strength, i.e., considerable mechanical resistance, pliability, fluid-tightness and resistance to greases, etc. For the application of layers of different nature, it is necessary to make use of coating appliances of different construction, such as a coating roll apparatus for solutions, an airbrush apparatus for emulsions, a scraper apparatus for relatively thick plastic substances, or an extrusion apparatus for pastes and powders plasticized by heat. These appliances are generally relatively expensive and it will be understood that a plurality of such appliances is necessary if it is desired to provide a combined coating in accordance with these various techniques for the preparation of a complex material as specified hereinabove.

In practice, the manufacture of extremely various complex materials may be envisaged since, in accordance with specific requirements, the material should comprise a different number of successive layers of different nature, although some of these, which will not necessarily be adjacent, may be of the same nature. The variation in number and nature of the coatings should permit the manufacture of materials of very considerable variety. In this respect, it should be noted that the four types of coating appliances permit the formation of coatings with the various materials the use of which can to the present day be envisaged.

The invention provides a combined coating machine which comprises a frame, a support consisting of two spaced side plates mounted for rotation in the said frame, means for securing the said support alternatingly in two different active positions in the said frame, the said support comprising, for acting in one of its active positions, a counter-pressure roll mounted for rotation between the said side plates so as to act on the strip to be coated, a removable tank for containing the coating substance, a dipping roll mounted in the said tank for conveying the coating substance either directly to the strip to be coated or to a removable coating roll acting on the strip, and advantageously a removable air brush device for acting on the coating applied to the strip, whereas, for acting in the other of its active positions, the said support comprises an endless belt on the one side of which the strip is guided, and an adjustable levelling or smoothing scraper for acting on the strip travelling on the said side.

According to a further feature of the invention, a removable extrusion device is provided for applying a coating on the strip travelling on the said side of the endless belt.

The side plates of the said support are, furthermore, connected together by a plurality of guiding rolls for the strip to be coated in each one of the active positions of the said support.

Figure 5:
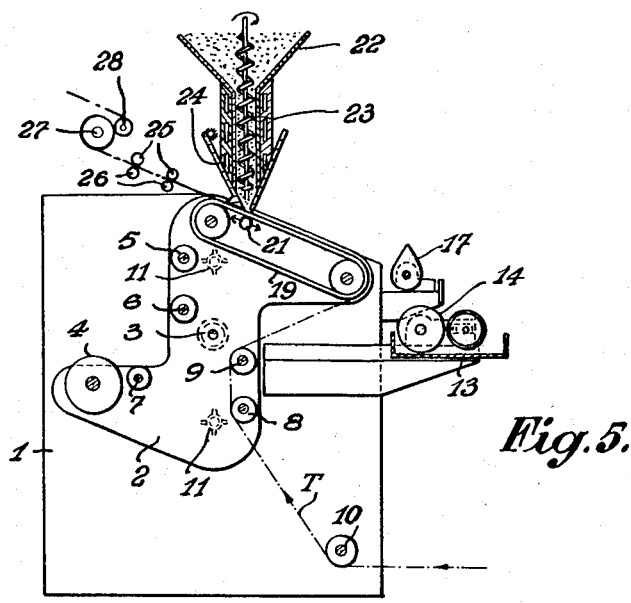

Further features and advantages of the invention will be apparent from the description of an embodiment of the machine according to the invention given hereinbelow with reference to the accompanying diagrammatic drawings, wherein:

FIGURE 1 is a view of the machine in the position suitable for coating with solutions, FIGURE 2 is a partial lateral view of the said machine, showing the main members thereof, FIGURE 3 is a view similar to that of FIGURE 1, drawn to a larger scale, the machine being equipped for coating with emulsions by means of an air brush, FIGURE 4 is a view of the machine in its other active position, suitable for coating with plastic substances, by means of a scraper, and FIGURE 5 is a view similar to that of FIGURE 4, the machine being adapted for coating by extrusion.

The views of FIGS. 1, 3, 4 and 5 are taken generally along line x—x in FIG. 2, while the section of the top part of FIG. 5 is taken at some distance to the right of line x—x.

As illustrated in the drawings, the machine comprises a frame 1, in which a support 2 consisting of two parallel side plates is mounted for rotation about a pivot 3. Mounted between the said side plates is a pressure roll 4 and also various rollers, such as 5, 6, 7, 8, 9, for the guiding of the strip to be coated which also travels over a roller 10 mounted in the frame 1. The support can be fixed in two active positions practically offset by 180°, with the aid of locking screws 11.

On slides 12 integral with the frame 1, it is possible to place a removable tank 13 for receiving the coating substance and provided with a dipping roll 14.

The strip to be coated may consist of a permanent support for the film to be formed, for example a strip of paper, cardboard, canvas, aluminium foil or the like, or it may consist of a provisional support, for example a metal strip or a canvas strip, which is not adhesive and from which the complex film is finally removed. The path T of the strip is indicated in broken lines and varies depending on the position of the support 2 and on the nature of the coating treatment.

In the position illustrated in FIGURE 1, this treatment is effected with the aid of a substance in solution, for example a solution of "saran" (polyvinylidene chloride, generally co-polymerised with vinyl chloride). The roll 14 transmits the solution on to a coating roll 15 which is in contact with the roll 14 and applies the solution on the strip to be coated which is pressed against the roll 15 by the counter-pressure roll 4, the position of which is vertically adjustable.

In order to use an emulsion, for example a "saran" emulsion, the roller 15 is removed and the strip is conveyed directly in contact with the roll 14. The quantity of emulsion applied on the strip may be regulated by an adjustable-position scraper 16 which is able to act over the entire width of the roll 14 or only in the marginal zones thereof. An airbrush device 17 is then brought near the roll 4, so as to make the coating layer regular. The said device 17 is removable, like the tank 13. This is to be understood to mean that it can be displaced into the inactive position by displacement on a support 18 integral with the frame 1.

The roll 15 and the scraper 16 may have a pivot extending through notches in the walls of the tank 13 and fitted provisionally in bearings provided on the frame in such manner as to determine the correct working position of the members associated with the tank 13.

By simple pivoting of the support 2, it is possible to displace the machine into the position according to FIGURE 4, for the application, by means of a levelling scraper, of plastic substances of appropriate viscosity, for example polyvinyl chloride, polyethylene, polyamide, etc.

An endless belt 19 surrounds two spaced rollers mounted in the support 2, on which is also mounted a levelling scraper device 20 which is adjustable as to height and inclination. The tank 13 containing the roll 14 is placed in position as in FIGURE 3, it being also possible to use the scraper 16 for adjusting the layer transmitted by the roll 14 on to the strip to be coated. A counter-pressure roll 21 is mounted under the belt 19 in the support 2, its position being adjustable relatively to that of the scraper 20.

In order to apply a coating by extrusion of material such as polyvinyl chloride, polyamide etc., the apparatus is left in the position illustrated in FIGURE 4, but the tank 13 is removed and the strip is applied directly on the endless belt 19. The coating is then effected with the aid of an extrusion device comprising a funnel 22 containing plastic substance, for example in powder, granular or paste form, the said substance being entrained by an endless screw 23 and being, if required, progressively heated to the desired temperature, for example of the order of 200° C., by electrical heating or some other means. The device delivers a sheet of liquid plastic substance through an adjustable aperture one side of which is constituted by a scraper 24 the position of which is adjustable at will and which is disposed directly in contact with the hot substance and provides for the equalization or levelling of the layer of substance deposited on the strip to be coated. In certain cases, the latter may be previously heated, if possible to the temperature of the plastic substance. The counter-pressure roll 21 is disposed, in such manner as to be adjustable as to position, under the outlet opening of the extrusion device. It will be seen that the belt 19 is longer in FIGURE 5, and its length can be selected in accordance with requirement.

According to the invention, the extrusion device is advantageously followed by one or more rollers of polished glass 25 acting on the extruded substance and capable of co-operating with steel rollers 26 or the like disposed under the strip to be coated. The glass rollers 25 may be siliconised or covered with some other non-adhesive substance. They may be internally cooled, for example by water circulation, or externally cooled by water supplied by a set of transmitting rolls. The vertical position of each steel roller 26 relatively to the corresponding glass roll 25 is advantageously adjustable in micrometric manner. Parallelism between the scraper 24 and the rolls 25, 26 must be strictly observed.

The rollers 25 and 26 are able to rotate in the advance direction of the strip to be coated, or in the opposite direction depending on the nature of the extrusion substance. It is even possible, in certain cases, to make the rollers 25 rotate in the direction of advance and the rollers 26 rotate in the opposite direction. These operational possibilities permit not only an increase in the speed of production, they also ensure considerable regularity in the thickness of the film over its entire extent and the elimination of minute perforations or pin-holes. Furthermore, they permit the obtaining, where required, of a rough film surface, facilitating the application of further films.

It should also be noted that the extruded film is longitudinally orientated by the action of the scraper, whereas it can be transversely orientated by the glass rolls which are able to crush it slightly and to stretch it in the transverse direction, if their linear velocity is greater than that of the strip.

It is also possible to provide supplementary cooling of the film with the aid of rollers such as 27, 28. To this end, the film could also be conveyed through a cooling bath, after having been subjected to the action of the first glass roller 25. The steel rollers 26 could also be cooled.

It should be noted that the scraper device 20 according to FIGURE 4 could be eliminated and replaced by the extrusion device according to FIGURE 5, only the scraper 24 of which would be retained in use, so as to act in the manner of the scraper 20 in FIGURE 4, the endless screw system 23 and the heating arrangement then being put out of action. It would also be possible to envisage a combination of the two devices which would then be mounted in removable manner for alternating use. It is to be noted that the section showing parts 22, 23 and 24 in FIG. 5 is taken at a distance to the right of line x—x in FIG. 2.

The various movable members with which the strip to be coated is in contact, notably the guiding rollers, the coating rolls, the counter-pressure rolls and the endless belt, can be mounted for free rotation in such manner as to be displaced under the action of the movement imparted to the strip, or alternatively some of these members may be driving members co-operating in the advancement of the strip.

It will be understood that the combined machine according to the invention, which permits the carrying into effect of the four types of coating described hereinabove, is very much more economical than would be the provision of four machines, each one for a pre-determined operation, and furthermore its utilisation is more practical.

What I claim is:

1. A combined coating machine for the application of various layers of plastic material on a support strip, comprising a frame, a support comprising two spaced side plates rotatably mounted on said frame and including two opposite portions each carrying a different coating device, means for alternately bringing the coating devices in substantially the same operative position by rotating the support 180°, means for securing said support in each of its alternative positions, one coating device including a counter-pressure roll rotatably mounted between said side plates, a tank for containing a coating substance removably mounted on said frame, a roll device mounted in said tank in contact with the coating substance therein, first guiding means carried by said support for guiding the support strip in contact with said roll device and said counter-pressure roll, another coating device including an endless belt passing on rollers mounted on said support, second guiding means carried by said support for guiding the support strip in contact with the outer side of said endless belt, means for applying a coating substance on the side of the support strip which does not come in contact with said belt, and a leveling scraper for acting on the strip thus coated traveling on the said outer belt side.

2. A machine as claimed in claim 1 further comprising an air-brush device removably mounted on said frame so as to be capable, when said support is in one alternative position, to act on the coating applied on said support strip.

3. A machine as claimed in claim 1 in which said scraper is removably mounted on said support.

4. A machine as claimed in claim 1 wherein said means for applying a coating substance comprises an extrusion device having an outlet opening for applying a coating substance on the strip travelling on said outer side of the endless belt.

5. A machine as claimed in claim 4 in which the outlet opening of the extrusion device is delimited on the starting side of the support strip by a wall formed by an adjustable leveling scraper.

6. A machine as claimed in claim 4 in which said extrusion device is removable.

(References on following page)

References Cited by the Examiner

UNITED STATES PATENTS

| | | | |
|---|---|---|---|
| 343,387 | 6/86 | Newton. | |
| 997,672 | 7/11 | Hawkes | 118—249 X |
| 1,027,144 | 5/12 | Neely | 118—410 |
| 1,207,263 | 12/16 | Archbald | 118—249 X |
| 1,980,923 | 11/34 | Lebel | 118—63 X |
| 2,312,927 | 3/43 | Murray | 118—101 |
| 2,395,903 | 3/46 | Nordquist | 118—249 X |
| 2,423,555 | 7/47 | Ender. | |
| 2,534,321 | 12/50 | Taylor | 117—111 |
| 2,968,279 | 1/61 | Peterson | 118—421 X |
| 2,981,223 | 4/61 | Olzsowka | 118—63 |

RICHARD D. NEVIUS, *Primary Examiner.*

JOSEPH B. SPENCER, *Examiner.*